(12) United States Patent
Onagi et al.

(10) Patent No.: US 9,111,684 B2
(45) Date of Patent: Aug. 18, 2015

(54) NON-AQUEOUS ELECTROLYTE STORAGE ELEMENT

(71) Applicants: Nobuaki Onagi, Kanagawa (JP); Eiko Hibino, Kanagawa (JP); Tatsumi Ishihara, Fukuoka (JP)

(72) Inventors: Nobuaki Onagi, Kanagawa (JP); Eiko Hibino, Kanagawa (JP); Susumu Okada, Kanagawa (JP); Tatsumi Ishihara, Fukuoka (JP)

(73) Assignees: Ricoh Company, Ltd., Tokyo (JP); Kyushu University, Fukuoka-shi (JP)

( * ) Notice: Subject to any disclaimer, the term of this patent is extended or adjusted under 35 U.S.C. 154(b) by 218 days.

(21) Appl. No.: 13/870,110

(22) Filed: Apr. 25, 2013

(65) Prior Publication Data

US 2013/0288113 A1    Oct. 31, 2013

(30) Foreign Application Priority Data

Apr. 27, 2012    (JP) .................. 2012-103321

(51) Int. Cl.
| | |
|---|---|
| *H01M 10/0525* | (2010.01) |
| *H01M 10/056* | (2010.01) |
| *H01G 9/025* | (2006.01) |
| *H01G 11/06* | (2013.01) |
| *H01G 11/52* | (2013.01) |

(52) U.S. Cl.
CPC ............... *H01G 9/025* (2013.01); *H01G 11/06* (2013.01); *H01G 11/52* (2013.01); *H01M 10/056* (2013.01); *H01M 10/0525* (2013.01); *Y02E 60/13* (2013.01)

(58) Field of Classification Search
CPC ... Y02E 60/122; H01G 9/025; H01M 10/052; H01M 10/0525; H01M 10/056
USPC ........................................................ 429/199
See application file for complete search history.

(56) References Cited

U.S. PATENT DOCUMENTS 4,009,323 A * 2/1977 Bennion et al. ............... 429/340
5,437,943 A    8/1995 Fujii et al.
(Continued)

FOREIGN PATENT DOCUMENTS

JP    07-099061    4/1995
JP    10-284044    10/1998
(Continued)

OTHER PUBLICATIONS

J. R Dahn et al. "Energy and Capacity Projections for Practical Dual-Graphite Cells", Journal of the Electrochemical Society, 147(3), 2000, pp. 899-901.

*Primary Examiner* — Stewart Fraser
(74) *Attorney, Agent, or Firm* — Oblon, McClelland, Maier & Neustadt, L.L.P.

(57) ABSTRACT

To provide a non-aqueous electrolyte storage element, including: a positive electrode which includes a positive-electrode active material capable of intercalating or deintercalating anions; a negative electrode which includes a negative-electrode active material capable of storing or releasing metallic lithium or lithium ion, or both thereof; a first separator between the positive electrode and the negative electrode; and a non-aqueous electrolyte which includes a non-aqueous solvent and a lithium salt dissolved in the non-aqueous solvent, wherein the non-aqueous electrolyte storage element includes a solid lithium salt at 25° C. and a discharge voltage of 4.0 V, wherein the non-aqueous electrolyte storage element includes an ion-exchange membrane between the first separator and the positive electrode, between the first separator and the negative electrode, or between the first separator and the positive electrode and between the first separator and the negative electrode.

15 Claims, 2 Drawing Sheets

(56) References Cited

U.S. PATENT DOCUMENTS

| | | | |
|---|---|---|---|
| 5,489,492 A | 2/1996 | Asami et al. | |
| 5,888,670 A | 3/1999 | Kawakami | |
| 2013/0309549 A1* | 11/2013 | Luski et al. | 429/145 |
| 2014/0272569 A1* | 9/2014 | Cai et al. | 429/213 |

FOREIGN PATENT DOCUMENTS

| | | |
|---|---|---|
| JP | 2000-021381 | 1/2000 |
| JP | 3352316 | 9/2002 |
| JP | 2005-251472 | 9/2005 |
| JP | 2005-259378 | 9/2005 |

* cited by examiner

NON-AQUEOUS ELECTROLYTE STORAGE ELEMENT

BACKGROUND OF THE INVENTION

1. Field of the Invention

The present invention relates to a non-aqueous electrolyte storage element such as non-aqueous electrolyte secondary cell, non-aqueous electrolyte capacitor and so on.

2. Description of the Related Art

In recent years, accompanied by downsizing and enhanced performance of mobile devices, a non-aqueous electrolyte secondary cell has improved properties as a non-aqueous electrolyte storage element having high energy density and become widespread. Also, attempts are underway to improve gravimetric energy density of the non-aqueous electrolyte secondary cell, aiming to expand its application to electric vehicles.

Conventionally, a lithium ion secondary cell including a positive electrode of a lithium-cobalt composite oxide and so on, a negative electrode of carbon, and a non-aqueous electrolyte obtained by dissolving a lithium salt in a non-aqueous solvent has been widely used as the non-aqueous electrolyte secondary cell.

Meanwhile, there exists a non-aqueous electrolyte secondary cell which is charged and discharged by intercalation or deintercalation of anions in a non-aqueous electrolyte to a positive electrode of a material such as conductive polymer, carbon material and so on and by intercalation or deintercalation of lithium ions in the non-aqueous electrolyte to a negative electrode of a carbon material (hereinafter, this type of cell may also be referred to as "dual carbon cell") (see Japanese Patent Application Laid-Open (JP-A) No. 2005-251472).

In this dual carbon cell, as indicated by the following reaction formula, the cell is charged by intercalation of anions such as $PF_6^-$ and so on from the non-aqueous electrolyte to the positive electrode and by intercalation of $Li^+$ from the non-aqueous electrolyte to the negative electrode, and the cell is discharged by deintercalation of anions such as $PF_6^-$ and so on from the positive electrode and deintercalation of $Li^+$ from the negative electrode to the non-aqueous electrolyte.

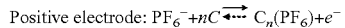

Positive electrode: $PF_6^- + nC \rightleftarrows C_n(PF_6) + e^-$

Negative electrode: $Li^+ + nC + e^- \rightleftarrows LiC_n$

→ charging reaction
←--- discharge reaction

A discharged capacity of the dual carbon cell is determined by: an anion storage capacity of the positive electrode; an amount of possible anion release of the positive electrode; a cation storage capacity of the negative electrode; an amount of possible cation release of the negative electrode; and an amount of anions and an amount of cations in the non-aqueous electrolyte. Accordingly, in order to improve the discharged capacity in the dual carbon cell, it is necessary to increase not only a positive-electrode active material and a negative-electrode active material but also an amount of the non-aqueous electrolyte including a lithium salt (see "Journal of the Electrochemical Society, 147(3) 899-901 (2000)").

In such a dual carbon cell, precipitation and dissolution of a lithium salt as a supporting salt may take place at any location in the cell where a non-aqueous electrolyte exists. However, precipitation of a large amount of the supporting salt on electrode surfaces causes a problem of decreased power density of the cell because the supporting salt in a solid state is an insulator.

SUMMARY OF THE INVENTION

The present invention aims at providing a non-aqueous electrolyte storage element which prevents a supporting salt from precipitating on an electrode surface, which includes a high discharged capacity and which improves a gravimetric energy density.

The non-aqueous electrolyte storage element of the present invention as a means for solving the problems includes:

a positive electrode which includes a positive-electrode active material capable of intercalating or deintercalating anions;

a negative electrode which includes a negative-electrode active material capable of storing or releasing of metallic lithium or lithium ion, or both thereof;

a first separator between the positive electrode and the negative electrode; and a non-aqueous electrolyte which includes a non-aqueous solvent and a lithium salt dissolved in the non-aqueous solvent, wherein the non-aqueous electrolyte storage element includes a solid lithium salt at 25° C. and a discharge voltage of 4.0V, wherein the non-aqueous electrolyte storage element includes an ion-exchange membrane between the first separator and the positive electrode, between the first separator and the negative electrode, or between the first separator and the positive electrode and between the first separator and the negative electrode.

The present invention may solve the conventional problems, achieve the object and provide a non-aqueous electrolyte storage element which prevents a supporting salt from precipitating on a surface of electrodes, which has a high discharged capacity, and which improves a gravimetric energy density.

Figure 1:
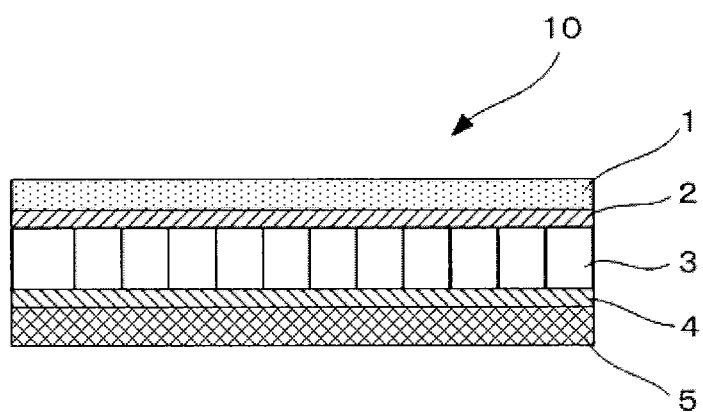
FIG. 1 is a schematic diagram illustrating one example of a non-aqueous electrolyte storage element of the present invention.

DETAILED DESCRIPTION OF THE INVENTION (Non-aqueous Electrolyte Storage Element)

A non-aqueous electrolyte storage element of the present invention includes a positive electrode, a negative electrode, a first separator and a non-aqueous electrolyte, and it includes a second separator and further includes other members according to necessity.

Examples of the non-aqueous electrolyte storage element include a non-aqueous electrolyte secondary cell, non-aqueous electrolyte capacitor and so on.

In the non-aqueous electrolyte storage element of the present invention, regarding a lithium salt as a supporting salt added in excess in a solid state within the storage element, when anions and cations are stored at positive and negative electrodes due to charging of the storage element, anions and cations move from the non-aqueous electrolyte to the positive and negative electrodes, resulting in decrease in a lithium salt concentration. Then, the lithium salt added in excess in a solid state within the storage element dissolves in the non-aqueous electrolyte to compensate for the concentration decrease of the non-aqueous electrolyte. Then, after the positive and negative electrodes are charged and the storage element is discharged, anions and cations are released from the positive and negative electrodes to the non-aqueous electrolyte. Once the lithium salt concentration of the non-aqueous electrolyte reaches saturation, the lithium salt precipitates and the solid lithium salt is stored within the storage element.

At this time, precipitation of the lithium salt as a supporting salt on a surface of the electrodes may be prevented by disposing an ion-exchange membrane between the separator and the positive electrode, between the separator and the negative electrode, or between the separator and the positive electrode and between the separator and the negative electrode. Also, the lithium salt always exists in excess in a solid state at the separators; during discharge when the lithium salt precipitates, the precipitation takes place with this lithium salt which already exists as a seed. Thus, it is possible to maintain a high power density of the storage element.

In the present invention, the non-aqueous electrolyte storage element is characterized in including a solid lithium salt at 25° C. and a discharge voltage of 4.0V. The non-aqueous electrolyte storage element is used at a discharge voltage of 3.0V to 5.4V, and the solid lithium salt is always present within the storage element at 25° C. and a discharge voltage of 4.0V.

A location of the solid lithium salt is not particularly restricted, and it may be present anywhere within the non-aqueous electrolyte storage element. For example, it may be precipitated in the non-aqueous electrolyte, or it may be precipitated on the positive electrode, the negative electrode, the first separator, the second separator, inside an outer can, or a combination thereof. It is particularly preferable that it is present on the first separator in view of decrease in power density due to the lithium salt coating an electrode surface. Specifically, the solid lithium salt is preferably included on a surface of the first separator or in vicinity thereof.

Here, whether or not the solid lithium salt is included at 25° C. and a discharge voltage of 4.0V may be confirmed as follows. That is, upon completion of discharge at 25° C. and a discharge voltage of 4.0V, the non-aqueous electrolyte storage element is disassembled, and a surface or a vicinity of at least any one of the positive electrode, the negative electrode, the first separator, the second separator and an inside the outer can is verified, for example, by: (1) a method of measuring crystals of $LiPF_6$ by microscopic observation; (2) a method for measuring a specific spectrum of $LiPF_6$ by an infrared spectroscopy (IR) analysis; (3) a method of measuring a specific spectrum of $LiPF_6$ by an x-ray diffraction; (4) a method of measuring an elemental emission spectrum by an inductively coupled plasma (ICP) emission analysis; or (5) a method of measuring a Raman spectrum specific to $LiPF_6$ by Raman spectroscopy.

The method (4) is an analysis of constituent elements of $LiPF_6$. It may be said that a $LiPF_6$ crystal exists if $LiPF_6$ is simultaneously found from an identical solid material. It is an anion or a cation that is intercalated to an electrode, and an anion and a cation do not exist simultaneously.

Here, that "a solid lithium salt is included at 25° C. and a discharge voltage of 4.0V" means that "an excess lithium salt is included" within the storage element, which may be rephrased as (1) to (4) below.

(1) The non-aqueous electrolyte includes an excess lithium salt that the lithium salt precipitates during discharge of the storage element. As the discharge of the storage element progresses, a part of the lithium salt precipitates in a solid state. Once the storage element is charged, the solid lithium salt dissolves in the non-aqueous electrolyte, and an operation of intercalation into the electrodes takes place. Thereby, it becomes possible to contain more amount of lithium salt within the storage element than an amount of lithium salt the non-aqueous electrolyte can contain, and a capacity of the storage element may be increased.

(2) Under use conditions (low temperature to room temperature to high temperature), a solubility of a lithium salt in the non-aqueous electrolyte is oversaturation. Here, the oversaturated solubility of lithium salt in the non-aqueous electrolyte varies depending on a temperature, types of the non-aqueous solvent and types of the lithium salt. When a solvent including ethylene carbonate (EC) and dimethyl carbonate (DMC) at a volume ratio of 1:2 is used as the solvent and $LiPF_6$ is used as the lithium salt, the oversaturated solubility of $LiPF_6$ at 25° C. is 5 mol/L to 7 mol/L. At −30° C., the oversaturated solubility of $LiPF_6$ is 0.5 mol/L or less, and it hardly dissolves. At 80° C., the oversaturated solubility of $LiPF_6$ is 7 mol/L to 8 mol/L. Here, at −30° C., the non-aqueous electrolyte becomes highly viscous, close to a solid condition. This reduces ion conductivity, and charging and discharging of the storage element do not take place smoothly.

(3) During discharge of the storage element, a solid lithium salt exists within the storage element. During charging, a state that the lithium salt is not oversaturated is possible, but it becomes oversaturated during discharge, and the solid lithium salt is precipitating somewhere within the storage element.

(4) As the discharge of the storage element progresses, the solid lithium salt always precipitates somewhere within the storage element. Thus, after 30 minutes from the initiation of the discharge of the storage element at a current of 1C, the storage element includes the solid lithium salt somewhere within the storage element. Here, 1C refers to an amount of current which exhausts the storage element capacity by 1 hour.

Here, the presence of the excess lithium salt (e.g., $LiPF_6$) may be confirmed as follows. That is, upon completion of discharge, the non-aqueous electrolyte storage element is disassembled, and a surface or a vicinity of at least any one of the positive electrode, the negative electrode, the first separator, the second separator and an inside of the outer can is verified, for example, by:

(1) a method of measuring crystals of $LiPF_6$ by microscopic observation; (2) a method for measuring a specific spectrum of $LiPF_6$ by an infrared spectroscopy (IR) analysis; (3) a method of measuring a specific spectrum of $LiPF_6$ by an x-ray diffraction; (4) a method of measuring an elemental emission spectrum by an inductively coupled plasma (ICP) emission analysis; or (5) a method of measuring a Raman spectrum specific to $LiPF_6$ by Raman spectroscopy.

Here, addition of a lithium salt as an excess supporting salt is explained.

An added amount of the excess lithium salt is such that, with a smaller charged electric quantity of an electrode among the electric quantity of a positive-electrode active material or a negative-electrode active material as a base, a total amount of the lithium salt derived from the non-aqueous electrolyte and the lithium salt added in a solid state is equivalent to an amount of the charged electric quantity of the electrode. Specifically, in order to prevent the Li metal from precipitating on a surface of the negative electrode during charging, the negative-electrode electric quantity is greater than the positive-electrode electric quantity. When the positive-electrode electric quantity as an active material characteristic is 100 mAh/g and an added amount of $LiPF_6$ is 10 mg, the positive-electrode electric quantity is 3.6 coulomb. An electric quantity of an anion that 1 mol of $LiPF_6$ has is 1F (Faraday), i.e. $9.64 \times 10^4$ coulomb. Thus, an amount of $LiPF_6$ having an electrical capacitance equivalent to 3.6 coulomb is $3.6/9.64 \times 10^4 = 3.7 \times 10^{-5}$ mol. This is 5.6 mg. This means that 5.6 mg or more of $LiPF_6$ is required as a sum of $LiPF_6$ derived from the non-aqueous electrolyte and $LiPF_6$ derived from solid addition. In practice, an added amount is such that the total amount of the $LiPF_6$ derived from the non-aqueous electrolyte and the $LiPF_6$ derived from the solid addition is 5.6 mg or greater.

In a case where an amount of the solvent in the non-aqueous electrolyte is insufficient, if ions are released from the electrodes, it is not possible to retain all the lithium salt in a dissolved state in the non-aqueous electrolyte. The non-aqueous electrolyte is saturated with the lithium salt.

As the discharge progresses, ions are further released from the electrodes. Then the lithium salt precipitates from the electrolyte and turns into a solid.

During charging, even though ions dissolved in the non-aqueous electrolyte are captured by the electrodes, the electrodes still have room to capture more.

The lithium salt dissolved in the non-aqueous electrolyte is captured by the electrodes. When the lithium salt concentration of the non-aqueous electrolyte decreases below the saturated concentration, the precipitated lithium salt dissolves in the non-aqueous electrolyte and this is again captured by the electrodes.

This action continues until the positive electrode is internally filled with $PF_6$ ions and the negative electrode is internally filled with Li ions. Thereby, the excess, non-dissolved lithium salt present in the non-aqueous electrolyte as a precipitate is intercalated to the electrode and contributes to charging and discharging.

Here, the storage amounts of positive and negative electrodes are not necessarily balanced, and the both electrodes are not necessarily filled completely with ions during charging.

In the present invention, aside from the non-aqueous electrolyte, the solid lithium salt is added within the storage element. At this time, the addition of the solid lithium salt is not a simple addition in the non-aqueous electrolyte. Rather, it is preferable to carry out at least any one of the following methods: (1) in case of adding it to the positive electrode, the solid lithium salt is mixed with a positive-electrode active material and added; (2) in case of adding it to the negative electrode, the solid lithium salt is mixed with a negative-electrode active material; and (3) in case of adding it to the separator, the solid lithium salt is adhered to the separator for addition. The addition methods of (1) to (3) are specifically described below. Here, the positive-electrode active material, the negative-electrode active material, the separator, the lithium salt are described in detail later.

(1) In case of adding the solid lithium salt to the positive electrode, for example, graphite powder as a positive-electrode active material and $LiPF_6$ powder as a solid lithium salt are kneaded, to which polyvinylidene fluoride (PVDF) as a binder, polyvinyl alcohol as a thickener and N-methyl-2-pyrrolidone (NMP) as a solvent are added and kneaded. Then, this is coated on an aluminum foil as a positive-electrode current collector followed by drying, and a positive electrode is obtained.

An added amount of the solid lithium salt in the positive electrode is not particularly restricted, and it may be appropriately selected according to purpose. Nonetheless, it is preferably 10 parts by mass to 80 parts by mass with respect to 100 parts by mass of the positive-electrode active material. That the solid lithium salt is kneaded in the positive electrode may be identified by finding Li, P and F at the same time in an elemental analysis by inductively coupled plasma (ICP). Only $PF_6^-$ as an anion is subjected to intercalation to the positive electrode, and there is not a case where all of Li, P and F exist at the same time unless $LiPF_6$ as a crystal exists.

(2) In case of adding the solid lithium salt to the negative electrode, for example, graphite powder as a negative-electrode active material and $LiPF_6$ powder as a solid lithium salt are kneaded, to which polyvinylidene fluoride (PVDF) as a binder, polyvinyl alcohol as a thickener and N-methyl-2-pyrrolidone (NMP) as a solvent are added and kneaded. This is coated on a copper foil as a negative-electrode current collector followed by drying, and a negative electrode is obtained.

An added amount of the solid lithium salt in the negative electrode is not particularly restricted, may be appropriately selected according to purpose. Nonetheless, it is preferably 10 parts by mass to 80 parts by mass with respect to 100 parts by mass of the negative-electrode active material.

That the solid lithium salt is kneaded in the negative electrode may be identified by finding Li, P and F at the same time in an elemental analysis by inductively coupled plasma (ICP).

(3) In case of adding the solid lithium salt to the first separator or the second separator, for example, a small amount of a binder and $LiPF_6$ powder as the solid lithium salt are mixed, which is adhered to a porous sheet such as glass-fiber filter paper followed by drying, and the first separator or the second separator is obtained.

An added amount of the solid lithium salt in the first separator or the second separator is not particularly restricted, and it may be appropriately selected according to purpose. Nonetheless, it is preferably 10 parts by mass to 300 parts by mass with respect to 100 parts by mass of the first separator or the second separator.

$LiPF_6$ powder hydrolyzes, and in case of kneading it in an electrode, a material which uses an aqueous solvent such as carboxymethylcellulose (CMC) and so on cannot be used as a binder. However, in case of kneading $LiPF_6$ powder in the first separator or the second separator, CMC may be used as a binder.

The non-aqueous electrolyte storage element of the present invention is not particularly restricted as long as it includes a solid lithium salt at 25° C. and a discharge voltage of 4.0V (that is, it includes an excess lithium salt within the storage element), and it may be appropriately selected according to purpose. As described above, it includes a positive electrode, a negative electrode, a first separator and a non-aqueous electrolyte, and it includes a second separator and further includes other members according to necessity.

The non-aqueous electrolyte storage element of the present invention has a structure in common with a conventional non-aqueous electrolyte storage element except that a solid lithium salt is included in at least any one of the positive electrode, the negative electrode, the first separator and the second separator be the method described above in order to include an excess lithium salt within the storage element.

<Positive Electrode>

The positive electrode is not particularly restricted as long as it includes a positive-electrode active material, and it may be appropriately selected according to purpose. Examples thereof include a positive electrode equipped with a positive-electrode material including a positive-electrode active material on a positive-electrode current collector and so on.

A shape of the positive electrode is not particularly restricted, and it may be appropriately selected according to purpose. Examples thereof include a flat plate and so on.

<<Positive-Electrode Material>>

The positive-electrode material is not particularly restricted, and it may be appropriately selected according to purpose. For example, it includes a positive-electrode active material, and it further includes a conductive agent, a binder, a thickener, and so on according to necessity.

—Positive-Electrode Active Material—

The positive-electrode active material is not particularly restricted as long as it is a material capable of intercalating or deintercalating anions, and it may be appropriately selected according to purpose. Examples thereof include carbonaceous materials, conductive polymers, and so on. Among these, the carbonaceous materials are particularly preferable in view of high energy density.

Examples of the conductive polymer include polyaniline, polypyrrole, polyparaphenylene, and so on.

Examples of the carbonaceous material include cokes, graphite (graphite) such as artificial graphite, natural graphite and so on, thermal decomposition products of organic matters produced under various thermal decomposition conditions, and so on. Among these, the artificial graphite and the natural graphite are particularly preferable.

As the carbonaceous material, a carbonaceous material having high crystallinity is preferable. The crystallinity may be evaluated by x-ray diffraction, Raman analysis and so on. For example, in a powder x-ray diffraction pattern using a CuKα line, an intensity ratio ($I_{2\theta=22.3°}/I_{2\theta=26.4°}$) of a diffraction peak intensity at 2θ=22.3° ($I_{2\theta=22.3°}$) to a diffraction peak intensity at 2θ=26.4° ($I_{2\theta=26.4°}$) is preferably 0.4 or less.

The carbonaceous material has a BET specific surface area by nitrogen adsorption of preferably 1 $m^2$/g to 100 $m^2$/g and an average particle diameter (median diameter) obtained by a laser diffraction-scattering method of preferably 0.1 μm to 100 μm.

—Binder—

The binder is not particularly restricted as long as it is a material stable for a solvent or an electrolyte used during manufacturing of electrodes, and it may be appropriately selected according to purpose. Examples thereof include: fluorine-based binders such as polyvinylidene fluoride (PVDF), polytetrafluoroethylene (PTFE) and so on; styrene-butadiene rubber (SBR); isoprene rubber; carboxymethylcellulose (CMC), and so on. These may be used alone or in combination of two or more. Here, in a case where no $LiPF_6$ powder is kneaded in the positive electrode, it is preferable to use the CMC as the binder and water as the solvent.

—Thickener—

Examples of the thickener include carboxymethylcellulose, methylcellulose, hydroxymethylcellulose, ethylcellulose, polyvinyl alcohol, oxidized starch, starch phosphate, casein and so on. These may be used alone or in combination of two or more.

—Conductive Agent—

Examples of the conductive agent include: metal materials such as copper, aluminum and so on; carbonaceous materials such as carbon black, acetylene black and so on. These may be used alone or in combination of two or more.

<<Positive-electrode Current Collector>>

A material, a shape, a size and a structure of the positive-electrode current collector are not particularly restricted and may be appropriately selected according to purpose.

The material of the positive-electrode current collector is not particularly restricted as long as it is formed of an electrically conductive material, and it may be appropriately selected according to purpose. Examples thereof include stainless steel, nickel, aluminum, copper, titanium, tantalum, and so on. Among these, stainless steel and aluminum are particularly preferable.

The shape of the positive-electrode current collector is not particularly restricted and may be appropriately selected according to purpose.

The size of the positive-electrode current collector is not particularly restricted as long as it is a size appropriately used for non-aqueous electrolyte storage element, and it may be appropriately selected according to purpose.

—Method for Preparing Positive Electrode—

The positive electrode may be manufactured by coating a positive-electrode material in a form of a slurry obtained by adding the binder, the thickener, the conductive agent, a solvent and so on according to necessity to the positive-electrode active material on the positive-electrode current collector followed by drying. The solvent is not particularly restricted, and it may be appropriately selected according to purpose. Examples thereof include an aqueous solvent, organic solvent, and so on. Examples of the aqueous solvent include water, alcohols, and so on. Examples of the organic solvent include N-methyl-2-pyrrolidone (NMP), toluene, and so on.

Here, the positive-electrode active material may be subjected to roll molding as it is to form a sheet electrode or to compression molding to form a pellet electrode.

<Negative Electrode>

The negative electrode is not particularly restricted as long as it includes a negative-electrode active material, and it may be appropriately selected according to purpose. Examples thereof include a negative electrode equipped with a negative-electrode material including a negative-electrode active material on a negative-electrode current collector and so on.

A shape of the negative electrode is not particularly restricted, and it may be appropriately selected according to purpose. Examples thereof include a flat plate and so on.

<<Negative-electrode Material>>

The negative-electrode material includes a negative-electrode active material, and it further includes a conductive agent and so on according to necessity binder.

—Negative-electrode Active Material—

The negative-electrode active material is not particularly restricted as long as it is a material which is capable of storing or releasing metallic lithium or lithium ion, or both thereof, and it may be appropriately selected according to purpose. Examples thereof include: carbonaceous materials; metal oxides capable of storing or releasing lithium such as antimony tin oxide, silicon monoxide and so on; metals or metal alloys capable of forming an alloy with lithium such as aluminum, tin, silicon, zinc and so on; complex alloy compounds including: a metal capable of forming an alloy with lithium, an alloy including the metal, and lithium; metallic lithium nitride such as lithium cobalt nitride and so on; and so on. These may be used alone or in combination of two or more. Among these, the carbonaceous materials are particularly preferable in view of safety and cost.

Examples of the carbonaceous material include: cokes, graphite (graphite) such as artificial graphite, natural graphite and so on, thermal decomposition products of organic matters produced under various thermal decomposition conditions, and so on. Among these, the artificial graphite and the natural graphite are particularly preferable.

—Binder—

The binder is not particularly restricted, may be appropriately selected according to purpose. Examples thereof include fluorine-based binders such as polyvinylidene fluoride (PVDF), polytetrafluoroethylene (PTFE) and so on, an ethylene-propylene-butadiene rubber (EPBR), a styrene-butadiene rubber (SBR), an isoprene rubber, carboxymethylcellulose (CMC), and so on. These may be used alone or in combination of two or more. Among these, the fluorine-based binders such as polyvinylidene fluoride (PVDF), polytetrafluoroethylene (PTFE) and so on and carboxymethylcellulose (CMC) are preferable, and the CMC is particularly preferable in view of improved number of repeated charging and discharging compared to other binders. Use of the CMC improves the number of repeated charge and discharge by twice or more compared to the PVDF (1-C charging and discharging, with the storage element life defined as 80% of its initial capacity). Here, in a case where no $LiPF_6$ powder is kneaded in the negative electrode, it is preferable to use the CMC as the binder and water as the solvent.

—Conductive Agent—

The conductive agent is not particularly restricted, and it may be appropriately selected according to purpose. Examples thereof include: metal materials such as copper, aluminum and so on; and carbonaceous materials such as carbon black, acetylene black and so on. These may be used alone or in combination of two or more.

<<Negative-electrode Current Collector>>

A material, a shape, a size and a structure of the negative-electrode current collector are not particularly restricted and may be appropriately selected according to purpose.

The material of the negative-electrode current collector is not particularly restricted as long as it is formed of an electrically conductive material, and it may be appropriately selected according to purpose. Examples thereof include stainless steel, nickel, aluminum, copper, and so on. Among these, stainless steel and copper are particularly preferable.

The shape of the current collector is not particularly restricted and may be appropriately selected according to purpose.

The size of the current collector is not particularly restricted as long as it is a size appropriately used for the non-aqueous electrolyte storage element, and it may be appropriately selected according to purpose.

Method for Preparing Negative Electrode—

The negative electrode may be manufactured by coating a negative-electrode material in a form of a slurry obtained by adding the binder, the conductive agent, a solvent and so on according to necessity to the negative-electrode active material on the negative-electrode current collector followed by drying. As the solvent, solvents similar to those for the method for preparing a positive electrode may be used.

Also, the binder, the conductive agent and so on are added to the negative-electrode active material. This is then subjected to roll molding as it is to form a sheet electrode or to compression molding to form a pellet electrode, or a thin film of the negative-electrode active material may be formed on the negative-electrode current collector by a method such as vapor deposition, sputtering, plating and so on.

<Non-aqueous Electrolyte>

The non-aqueous electrolyte is an electrolyte obtained by dissolving a lithium salt in a non-aqueous solvent.

—Non-aqueous Solvent—

The non-aqueous solvent is not particularly restricted as long as it is an aprotic organic solvent, and it may be appropriately selected according to purpose. Examples thereof include: carbonate-based organic solvents such as cyclic carbonates, chain carbonates and so on; ester-based organic solvents such as cyclic esters, chain esters and so on; ether-based organic solvents such as cyclic ethers, chain ethers and so on; and so on. These may be used alone or in combination of two or more. Among these, the carbonate-based organic solvents are preferable in view of high solubility of lithium salt.

Examples of the cyclic carbonates include propylene carbonate (PC), ethylene carbonate (EC), butylene carbonate (BC), vinylene carbonate (VC), and so on.

Examples of the chain carbonates include dimethyl carbonate (DMC), diethyl carbonate (DEC), methylethyl carbonate, and so on.

Examples of the cyclic esters include γ-butyrolactone (γBL), 2-methyl-γ-butyrolactone, acetyl-γ-butyrolactone, γ-valerolactone, and so on.

Examples of the chain esters include alkyl propionate, dialkyl malonate, alkyl acetate, and so on.

Examples of the cyclic ethers include tetrahydrofuran, alkyltetrahydrofuran, alkoxytetrahydrofuran, dialkoxytetrahydrofuran, 1,3-dioxolan, alkyl-1,3-dioxolan, 1,4-dioxolan, and so on.

Examples of the chain ethers include 1,2-dimethoxyethane (DME), diethyl ether, ethylene glycol dialkyl ether, diethylene glycol dialkyl ether, triethylene glycol dialkyl ether, tetraethylene glycol dialkyl ether, and so on.

Among these, a mixture of ethylene carbonate (EC) and dimethyl carbonate (DMC) is preferable. A mixing ratio of ethylene carbonate (EC) to dimethyl carbonate (DMC) (EC:DMC) as a volume ratio is preferably 1:1 to 1:10, and particularly preferably 1:2.

—Lithium Salt—

The lithium salt is not particularly restricted, and it may be appropriately selected according to purpose. Examples thereof include lithium hexafluorophosphate ($LiPF_6$), lithium perchlorate ($LiClO_4$), lithium chloride (LiCl), lithium fluoroborate ($LiBF_4$), $LiB(C_6H_5)_4$, lithium hexafluoroarsenate ($LiAsF_6$), lithium trifluoromethanesulfonate ($LiCF_3SO_3$), lithium bis(trifluoromethylsulfonyl)imide ($LiN(CF_3SO_2)_2$), lithium bis(perfluoroethylsulfonyl)imide ($LiN(C_2F_5SO_2)_2$), and so on. These may be used alone or in combination of two or more. Among these, $LiPF_6$ is particularly preferable in view of size of storage capacity of anions in the carbon electrode.

The concentration of the lithium salt is not particularly restricted, and it may be appropriately selected according to purpose. Nonetheless, it is preferably 0.5 mol/L to 3 mol/L in the organic solvent, and it is particularly preferably around 1 mol/L in view of viscosity.

<First Separator>

The first separator is disposed between the positive electrode and the negative electrode to prevent a short circuit between the positive electrode and the negative electrode.

A material, a shape, a size and a structure of the first separator are not particularly restricted and may be appropriately selected according to purpose.

Examples of the material of the first separator include: paper such as kraft paper, vinylon blended paper, synthetic pulp blended paper and so on; polyolefin non-woven such as cellophane, polyethylene graft membrane, polypropylene melt-blown non-woven and so on; polyamide non-woven fabric; glass fiber non-woven; and so on.

Examples of the shape of the first separator include a sheet shape and so on.

The size of the first separator is not particularly restricted as long as it is a size appropriate for the non-aqueous electrolyte storage element, and it may be appropriately selected according to purpose.

The structure of the first separator may be a single-layer structure or a multi-layer structure.

<Ion-exchange Membrane>

The ion-exchange membrane is a membrane which selectively permeates ions, and an ion-exchange membrane used for desalination of seawater and so on is used, for example.

A material, a shape, a size and a structure of the ion-exchange membrane are not particularly restricted and may be appropriately selected according to purpose.

The ion-exchange membrane preferably has a structure that ions are added in the membrane and that many fine pores are formed.

The ion-exchange membrane has a mechanism that only ions having a charge opposite to the charge of the ions in the ion-exchange membrane pass through the pores. Thus, it has a characteristic that it selectively permeates ions having either a positive or negative charge, and there are an anion-exchange membrane which selectively permeates anions and a cation-exchange membrane which selectively permeates cations.

In the present invention, the anion-exchange membrane is disposed on a side of the positive electrode so that only anions pass the anion-exchange membrane. On the other hand, the cation-exchange membrane is disposed on a side of the negative electrode so that only cations pass the cation-exchange membrane. With such a configuration, the non-aqueous electrolyte including an excess lithium salt as a supporting salt and having a concentration reached to a saturation concentration does not contact the electrode active material directly, and anions and cations are never present in the same amount of oversaturation in a vicinity of the electrodes. Thus, no lithium salt precipitates on the electrodes. The lithium salt in a solid state is an insulator. If this covers an electrode surface, an output current density of the storage element decreases.

Examples of the cation-exchange membrane include a solid electrolyte membrane including a polyethylene oxide as a substrate, with a carboxylic acid group, a phosphate group or a sulfonic acid group added to the substrate, and so on. The solid electrolyte membrane can selectively pass only a lithium ion. Also, solid oxide electrolytes such as LaLiTiO, LiTiAl($PO_4$) and so on, thio-LISICON materials such as $Li_2S$—$P_2S_5$ and so on acts as a solid electrolyte which selectively passes cations.

Examples of the anion-exchange membrane include a solid electrolyte membrane including a polyethylene oxide as a substrate, with a positively charged group (e.g. amino group and so on) added to the substrate, and so on.

<Second Separator>

The second separator is preferably disposed between the positive electrode and the anion-exchange membrane, between the negative electrode and the cation-exchange membrane, or between the positive electrode and the anion-exchange membrane and between the negative electrode and the cation-exchange membrane, in order to retain the non-saturated, thin non-aqueous electrolyte of around 1 mol/L in a vicinity of the electrodes.

A material, a shape, a size and a structure of the second separator are not particularly restricted and may be appropriately selected according to purpose. Nonetheless, those described for the first separator are also used.

<Other Members>

The other members are not particularly restricted, may be appropriately selected according to purpose. Examples thereof include an outer can, an electrode lead wire and so on.

<Method for Manufacturing Non-aqueous Electrolyte Storage Element>

The non-aqueous electrolyte storage element of the present invention is manufactured by assembling the positive electrode, the negative electrode, the first separator and the non-aqueous electrolyte, and the second separator used according to necessity into an appropriate shape. Further, it is possible to use other components such as outer can according to necessity. A method for assembling the non-aqueous electrolyte storage element is not particularly restricted, and it may be appropriately selected from commonly employed methods.

Here, FIG. 1 is a schematic diagram illustrating one example of the non-aqueous electrolyte storage element of the present invention. The non-aqueous electrolyte storage element 10 contains in an outer can (not shown): a positive electrode 1 including a positive-electrode active material capable of intercalating or deintercalating anions; a negative electrode 5 including a negative-electrode active material capable of storing or releasing metallic lithium or lithium ion, or both thereof; and a first separator 3 between the positive electrode 1 and the negative electrode 5, wherein the positive electrode 1 is in contact with an anion-exchange membrane 2, the anion-exchange membrane 2 is in contact with the first separator 3, and further the first separator 3 is in contact with the negative electrode 5 via a cation-exchange membrane 4.

The positive electrode 1, the negative electrode 5, the first separator 3, the anion-exchange membrane 2 and the cation-exchange membrane 4 are immersed in a non-aqueous electrolyte (not shown) obtained by dissolving a lithium salt as a supporting salt in a non-aqueous solvent. Here, an outer can and an electrode lead wire are not illustrated in FIG. 1.

Figure 2:
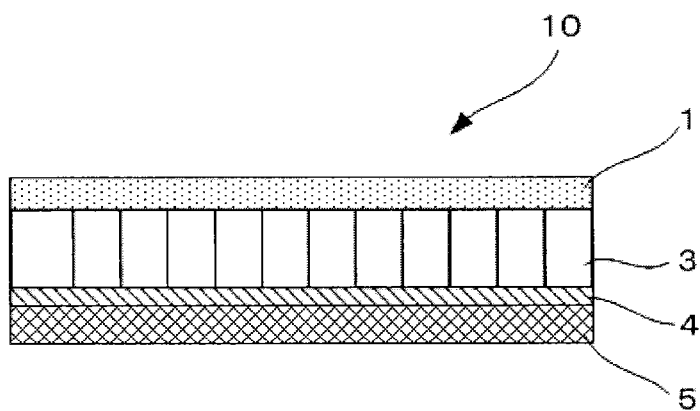
FIG. 2 is a schematic diagram illustrating another example of a non-aqueous electrolyte storage element of the present invention.

FIG. 2 is a schematic diagram illustrating another example of the non-aqueous electrolyte storage element of the present invention. The non-aqueous electrolyte storage element 10 in FIG. 2 is similar to the non-aqueous electrolyte storage element in FIG. 1 except that it does not include the anion-exchange membrane 2 of the non-aqueous electrolyte storage element in FIG. 1.

Figure 3:
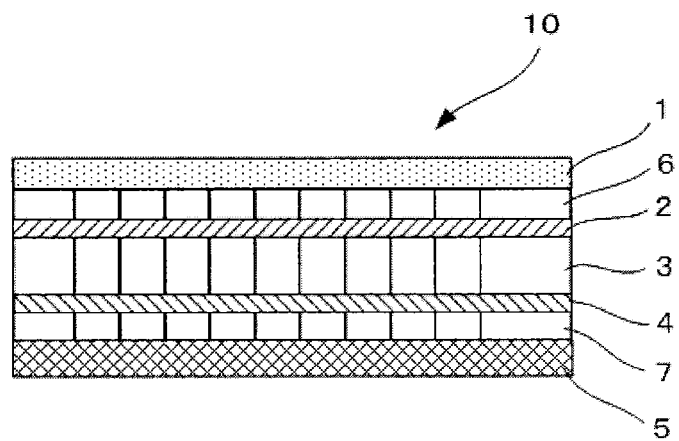
FIG. 3 is a schematic diagram illustrating another example of a non-aqueous electrolyte storage element of the present invention.

FIG. 3 is a schematic diagram illustrating another example of the non-aqueous electrolyte storage element of the present invention. The non-aqueous electrolyte storage element 10 of FIG. 3 is similar to the non-aqueous electrolyte storage element of FIG. 1 except that second separators 6, 7 are included between the positive electrode 1 and the anion-exchange membrane 2, and between the negative electrode 5 and the cation-exchange membrane 4 of the non-aqueous electrolyte storage element of FIG. 1.

Figure 4:
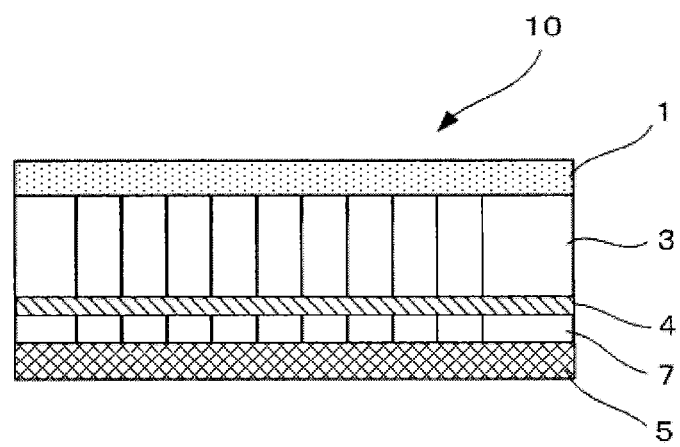
FIG. 4 is a schematic diagram illustrating another example of a non-aqueous electrolyte storage element of the present invention.

FIG. 4 is a schematic diagram illustrating another example of the non-aqueous electrolyte storage element of the present invention. The non-aqueous electrolyte storage element 10 of FIG. 4 is similar to the non-aqueous electrolyte storage element of FIG. 3 except that the anion-exchange membrane 2 and the second separator 6 are not included in the non-aqueous electrolyte storage element of FIG. 3.

—Shape—

A shape of the non-aqueous electrolyte storage element of the present invention is not particularly restricted, and it may be appropriately selected according to use from various shapes that are commonly employed. Examples of the shape include: a cylinder type with a sheet electrode and a separator in a spiral shape; a cylinder type having an inside-out structure with a pellet electrode and a separator in combination; a coin type with a pellet electrode and a separator laminated, and so on.

<Use>

Use of the non-aqueous electrolyte storage element of the present invention is not particularly restricted, and it may be used for various applications. Examples thereof include a notebook computer, a stylus-operated computer, a mobile computer, an electronic book player, a mobile phone, a mobile fax, a mobile copier, a mobile printer, a headphone stereo, a video movie, a liquid crystal television, a handy cleaner, a portable CD, a minidisk, a transceiver, an electronic organizer, a calculator, a memory card, a mobile tape recorder, a radio, a back-up power supply, a motor, a lighting equipment, a toy, a game equipment, a clock, a strobe, a camera and so on.

EXAMPLES

Hereinafter, examples of the present invention are explained, but the examples shall not be construed as limiting the scope of the present invention.

Example 1

<Preparation of Positive Electrode>

Carbon powder (KS-6, manufactured by TIMCAL Ltd.) was used as a positive-electrode active material. The carbon powder had a BET specific surface area by nitrogen adsorption of 20 $m^2/g$ and an average particle diameter (median diameter) measured by a laser-diffraction particle-size analyzer (SALD-2200, manufactured by Shimadzu Corporation) of 3.4 µm.

First, 5 mL of water was added to 10 mg of the carbon powder (KS-6, manufactured by TIMCAL Ltd.), 10 mg of a binder (a 3-% by mass aqueous solution of carboxymethylcellulose (CMC)) and 10 mg of a conductive agent (breakdown: 95% by mass of acetylene black and 5% by mass of polytetrafluoroethylene) followed by kneading, and a slurry was prepared. Then, this was crimped to a stainless steel mesh and vacuum dried at 200° C. for 4 hours, and thereby a positive electrode was formed. At this time, the carbon powder (graphite) in the positive electrode crimped to the stainless steel mesh had a mass of 10 mg.

<Preparation of Negative Electrode>

Carbon powder (MAGD, manufactured by Hitachi Chemical Co., Ltd.) was used as a negative-electrode active material. The carbon powder had a BET specific surface area by nitrogen adsorption of 4,600 $m^2/g$, an average particle diameter (median diameter) measured by laser-diffraction particle-size analyzer (SALD-2200, manufactured by Shimadzu Corporation) of 20 µm and a tap density of 630 $kg/m^3$.

First, 5 mL of water was added to 350 mg of a mixture composed of 96% by mass of the carbon powder (MAGD, manufactured by Hitachi Chemical Co., Ltd.) and 4% by mass of a binder (a 3-% by mass aqueous solution of carboxymethylcellulose (CMC)) followed by kneading, and a slurry was prepared. Then, this was crimped to a copper foil and vacuum dried at 160° C. for 1 hour, and thereby a negative electrode was formed. At this time, the carbon powder (graphite) in the negative electrode crimped to the copper foil had a mass of 10 mg.

<Non-aqueous Electrolyte>

As a non-aqueous electrolyte, 0.3 mL of a solvent in which 1 mol/L of $LiPF_6$ had been dissolved [ethylene carbonate (EC): dimethyl carbonate (DMC)=1:2 (volume ratio)] was prepared.

<First Separator>

A laboratory filter paper (GA-100 GLASS FIBER FILTER, manufactured by Advantec Group) was prepared as a first separator, and 200 mg of solid $LiPF_6$ powder was kneaded in the first separator.

<Cation-exchange Membrane>

As a cation-exchange membrane, a sulfide-glass solid electrolyte membrane of $30Li_2S.26B_2S_3.44LiI$ (mol %) (prototype by Ricoh Company, Ltd.) was used. The cation-exchange membrane had a thickness of 15 µm.

<Anion-exchange Membrane>

As an anion-exchange membrane, a membrane of a plain-woven fabric made of polyethylene as a base with an ion-exchange group fixed thereto (NEOSEPTA AHA, manufactured by ASTOM Corporation) was used. The anion-exchange membrane had a thickness of 50 µm.

<Preparation of Storage Element>

Using the positive electrode, the negative electrode, the first separator, the anion-exchange membrane and the cation-exchange membrane, a non-aqueous electrolyte storage element 10 of a semi-open cell type of Example 1 as illustrated in FIG. 1 was prepared in an argon dry box.

The non-aqueous electrolyte storage element 10 of Example 1 thus prepared had a configuration that a positive electrode 1 was in contact with an anion-exchange membrane 2, that this anion-exchange membrane 2 was in contact with a first separator 3 and further that the first separator 3 was in contact with a negative electrode 5 via a cation-exchange membrane 4. Here, an outer can and an electrode lead wire of the non-aqueous electrolyte storage element 10 are not illustrated in FIG. 1.

<Method for Measuring Discharged Capacity at Beginning and after 100 Times>

The non-aqueous electrolyte storage element of Example 1 thus prepared was charged at a room temperature (25° C.) to a charge termination voltage of 5.2V at a constant current of 1 $mA/cm^2$. After the first charging, it was discharged to 3.0V at a constant current of 1 $mA/cm^2$. This cycle of charge and discharge was repeated 100 times. A discharged capacity was measured at the beginning and after charging and discharging 100 times using a charge-discharge test apparatus (HJ-SD8 SYSTEM, manufactured by Hokuto Denko Corporation). Here, the discharged capacity was a mass conversion value per 10 mg of the positive-electrode active material. In Example 1, the discharged capacity at the beginning was 120 mAh/g of positive electrode, and the discharged capacity after charging and discharging 100 times was 80 mAh/g of positive electrode. Thereafter, the discharged capacity after 300 times of charge and discharge was 80 mAh/g of positive electrode, and degradation was small. Even after 1,000 times of charge and discharge, the discharged capacity of 75 mAh/g of positive electrode was maintained.

<Presence or Absence of Lithium Salt Precipitation on Electrode Surface after Repeating Charge and Discharge 100 Times>

After repeating charge and discharge 100 times, the non-aqueous electrolyte storage element was disassembled. Surfaces of the positive electrode and the negative electrode were observed with a microscope (SMZ-1500, manufactured by Nikon Corporation), and presence or absence of $LiPF_6$ crystals was determined. In Example 1, lithium salt precipitation was not observed on the electrode surfaces.

<Determination of Presence or Absence of Solid Lithium Salt on First Separator at 25° C. and at Discharge Voltage of 4.0V>

The prepared non-aqueous electrolyte storage element was discharged at 25° C. and at a discharge voltage of 4.0V. Then, the non-aqueous electrolyte storage element was disassembled, and a surface of the first separator was observed with a microscope (SMZ-1500, manufactured by Nikon Corporation). $LiPF_6$ crystals may be determined if somewhat bright crystals are observed other than graphite as the active material which appears black, and thereby, presence or absence of solid $LiPF_6$ on the first separator was determined. In Example 1, it was confirmed that solid $LiPF_6$ salt was present on the first separator.

Example 2

A non-aqueous electrolyte storage element 10 of a semi-open cell type of Example 2 was prepared as illustrated in FIG. 2 in the same manner as Example 1 except that the anion-exchange membrane of Example 1 was not disposed. In the non-aqueous electrolyte storage element 10 of Example 2 thus prepared, a positive electrode 1 was directly in contact with a first separator 3, and further the first separator 3 was in contact with a negative electrode 5 via a cation-exchange membrane 4. Here, an outer can and an electrode lead wire of the non-aqueous electrolyte storage element 10 are not illustrated in FIG. 2.

Next, the non-aqueous electrolyte storage element of Example 2 thus prepared was measured for a discharged capacity at the beginning and after charging and discharging 100 times in the same manner as Example 1. The discharged capacity at the beginning was 120 mAh/g of positive electrode, and the discharged capacity after charging and discharging 100 times was 80 mAh/g of positive electrode.

After charging and discharging 100 times, the storage element was disassembled to examine lithium salt precipitation, and lithium salt precipitation was not observed on a surface of the negative electrode. Slight lithium salt precipitation was observed on a surface of the positive electrode, but it did not interfere with the charge and discharge of 1 mAh/cm².

Example 3

<Second Separator>

A laboratory filter paper (GA-100 GLASS FIBER FILTER, manufactured by Advantec Group) was prepared as a second separator.

<Preparation of Storage Element>

Using the positive electrode, the negative electrode, the first separator in which 200 mg of solid $LiPF_6$ powder was kneaded, the anion-exchange membrane and the cation-exchange membrane prepared in the same manner as Example 1, and the second separator, a non-aqueous electrolyte storage element of a semi-open cell type of Example 3 was prepared in an argon dry box as illustrated in FIG. 3 was prepared in the same manner as Example 1. In the non-aqueous electrolyte storage element 10 of FIG. 3, a positive electrode 1 was in contact with an anion-exchange membrane 2 via a second separator 6, and the anion-exchange membrane 2 was in contact with a first separator 3. Further, the first separator 3 was in contact with a second separator 7 via a cation-exchange membrane 4, and the second separator 7 was in contact with a negative electrode 5. The lithium salt was added only to the first separator 3 in FIG. 3. That is, no lithium salt was added to the second separators 6, 7. Thus, when the non-aqueous electrolyte of 1 mol/L was poured, only a portion of the first separator 3 turned to a saturated electrolyte. Here, an outer can and an electrode lead wire of the non-aqueous electrolyte storage element 10 are not illustrated in FIG. 3.

Next, a discharged capacity of the non-aqueous electrolyte storage element of Example 3 thus prepared was measured at the beginning and after charging and discharging 100 times in the same manner as Example 1. The discharged capacity at the beginning was 120 mAh/g of positive electrode, and the discharged capacity after charging and discharging 100 times was 100 mAh/g of positive electrode.

In Example 3, the electrode active material was in contact with the non-aqueous electrolyte having a concentration comparable to that of a lithium ion secondary cell in practical use, and ion exchange was stably performed. This was because the non-aqueous electrolyte had an appropriate ion conductivity and viscosity. Also, an insulator film as an SEI (Solid Electrolyte Interface) was formed on a surface of the negative electrode. An appropriate insulator film cannot be formed unless a non-aqueous electrolyte having an appropriate concentration and a negative electrode is in contact. It was considered that a too thick SEI was formed during the initial charging in a non-aqueous electrolyte including $LiPF_6$ to a nearly saturation of about 5 mol/L.

In Example 3, both the positive and the negative electrodes were in contact with a non-aqueous electrolyte having an ordinary concentration of 1 mol/L, and it was considered that a reasonable ion exchange was performed as an operation of the electrodes. The first separator 3 had an excess amount of the lithium salt included therein, and the non-aqueous electrolyte existing there had a high concentration. However, the first separator 3 was sandwiched between ion-exchange membranes, only anions ($PF_6^-$) could move toward the positive electrode, and only cations ($Li^+$) could move toward the negative electrode. Thus, the saturated electrolyte was limited to a region of the first separator 3. Even if the high-concentration electrolyte of the first separator 3 and the low-concentration electrolyte of the positive electrode 1 and the second separator 7 are mixed due to aging, it is almost unlikely that the SEI is in an inappropriate state. This is because the SEI formation on the negative electrode 5 is almost completed during the initial charging. Accordingly, it was considered that the discharged capacity of the non-aqueous electrolyte storage element has slightly larger than those of Examples 1 and 2.

Example 4

A non-aqueous electrolyte storage element of a semi-open cell type of Example 4 illustrated in FIG. 4 was prepared in the same manner as Example 3 except that the anion-exchange membrane of Example 3 was not disposed. In the non-aqueous electrolyte storage element 10 of Example 4 thus prepared 10, a positive electrode 1 was directly in contact with a first separator 3; further, the first separator 3 was in contact with a next second separator 7 via a cation-exchange membrane 4; and this second separator 7 was in contact with a negative electrode 5. Here, an outer can and an electrode lead wire of the non-aqueous electrolyte storage element are not illustrated in FIG. 4.

The lithium salt was added only to the first separator 3 in FIG. 4, and the lithium salt was not added to the second separator 7. Thus, when the non-aqueous electrolyte of 1 mol/L was poured, only a portion of the first separator 3 turned to a saturated electrolyte.

Next, a discharged capacity of the non-aqueous electrolyte storage element of Example 4 thus prepared was measured at the beginning and after charging and discharging 100 times in the same manner as Example 1. The discharged capacity at the beginning was 120 mAh/g of positive electrode, and the discharged capacity after charging and discharging 100 times was 90 mAh/g of positive electrode.

Example 5

A non-aqueous electrolyte storage element of a semi-open cell type of Example 5 was prepared as illustrated in FIG. 4 in the same manner as Example 3 except that the anion-exchange membrane of Example 3 was not disposed and that 0.3 mL of a solvent including 0.5 mol/L of $LiPF_6$ dissolved therein [ethylene carbonate (EC) and dimethyl carbonate (DMC)=1:2 (volume ratio)] was prepared as a non-aqueous electrolyte. In the non-aqueous electrolyte storage element 10 of Example 5 thus prepared, a positive electrode 1 was directly in contact with a first separator 3; further, the first separator 3 was in contact with a second separator 7 via a cation-exchange membrane 4; and the second separator 7 was in contact with a negative electrode 5. Here, an outer can and an electrode lead wire of the non-aqueous electrolyte storage element 10 are not illustrated in FIG. 4.

The lithium salt was added only to the first separator 3 in FIG. 4. The lithium salt was not added to the second separator 7. Thus, when the non-aqueous electrolyte of 0.5 mol/L was poured, only a portion of the first separator 3 turned to a saturated electrolyte.

Next, a discharged capacity of the non-aqueous electrolyte storage element of Example 5 thus prepared was measured at the beginning and after charging and discharging 100 times in the same manner as Example 1. The discharged capacity at the beginning was 120 mAh/g of positive electrode, and the discharged capacity after charging and discharging 100 times was 100 mAh/g of positive electrode.

Example 6

A non-aqueous electrolyte storage element of a semi-open cell type of Example 6 was prepared as illustrated in FIG. 4 in the same manner as Example 3 except that the anion-exchange membrane of Example 3 was not disposed and that 0.3 mL of a solvent including 2 mol/L of $LiPF_6$ dissolved therein [ethylene carbonate (EC) and dimethyl carbonate (DMC)= 1:2 (volume ratio)] was prepared as a non-aqueous electrolyte. In the non-aqueous electrolyte storage element 10 of Example 6 thus prepared, a positive electrode 1 was directly in contact with a first separator 3; further, the first separator 3 was in contact with a second separator 7 via cation-exchange membrane 4; and this second separator 7 was in contact with a negative electrode 5. Here, an outer can and an electrode lead wire of the non-aqueous electrolyte storage element 10 are not illustrated in FIG. 4.

The lithium salt was added only to the first separator 3 in FIG. 4. The lithium salt was not added to the second separator 7. Thus, when the non-aqueous electrolyte of 2 mol/L was poured, only a portion of the first separator 3 turned to a saturated electrolyte.

Next, a discharged capacity of the non-aqueous electrolyte storage element of Example 6 thus prepared was measured at the beginning and after charging and discharging 100 times in the same manner as Example 1. The discharged capacity at the beginning was 100 mAh/g of positive electrode, and the discharged capacity after charging and discharging 100 times was 70 mAh/g of positive electrode.

In Example 6, the non-aqueous electrolyte added during preparation of the storage element had a concentration of 2 mol/L, which was high compared to Examples 4 and 5. Thus, both the discharged capacity and the repetition capacity of the storage element decreased. When the non-aqueous electrolyte concentration was high, a film called an SEI on a negative electrode was too thick, resulting in the degraded properties of the storage element. In this case, the properties slightly degraded because of the same reason. There is a proportional relationship between the lithium salt concentration and the non-aqueous electrolyte concentration, and it became difficult to handle a high-concentration electrolyte in manufacturing a storage element. In that sense, the non-aqueous electrolyte concentration during preparation of a storage element is preferably 2 mol/L or less. The non-aqueous electrolyte concentration being too small is not preferable since it reduces an ion concentration and electrical conductivity, resulting in decrease in power density of the storage element. Thus, the concentration of the non-aqueous electrolyte is more preferably 0.5 mol/L to 2 mol/L.

Example 7

In Example 1, carboxymethylcellulose (CMC) as a binder in the positive electrode and the negative electrode was changed to polyvinylidene fluoride (PVDF). In accordance with this, NMP (N-methyl-2-pyrrolidone) was used as the solvent instead of water, and a non-aqueous electrolyte storage element was prepared as follows.
<Preparation of Positive Electrode>

As a positive-electrode active material, carbon powder (KS-6, manufactured by TIMCAL Ltd.) was used. The carbon powder had a BET specific surface area by nitrogen adsorption of 20 $m^2$/g and an average particle diameter (median diameter) measured by a laser diffraction particle-size analyzer (SALD-2200, manufactured by Shimadzu Corporation) of 3.4 μm.

First, 5 mL of N-methyl-2-pyrrolidone (NMP) was added to 10 mg of the carbon powder (KS-6, manufactured by TIMCAL Ltd.), 5 mg of binder (polyvinylidene fluoride (PVDF) and 10 mg of a conductive agent (breakdown: 95% by mass of acetylene black and 5% by mass of polytetrafluoroethylene) followed by kneading, and a slurry was prepared. Then, it was crimped to a stainless steel mesh and vacuum dried at 180° C. for 2 hours, and thereby a positive electrode was formed. At this time, the carbon powder (graphite) in the positive electrode crimped to the stainless steel mesh had a mass of 10 mg.
<Preparation of Negative Electrode>

Carbon powder (MAGD, manufactured by Hitachi Chemical Co., Ltd.) was used as a negative-electrode active material. The carbon powder had a BET specific surface area by nitrogen adsorption of 4,600 $m^2$/g, an average particle diameter (median diameter) measured by laser-diffraction particle-size analyzer (SALD-2200, manufactured by Shimadzu Corporation) of 20 μm and a tap density of 630 kg/$m^3$.

First, 5 mL of N-methyl-2-pyrrolidone (NMP) was added to 360 mg of the carbon powder (MAGD, manufactured by Hitachi Chemical Co., Ltd.), 5 mg of binder (polyvinylidene fluoride (PVDF) and 10 mg of a conductive agent (breakdown: 95% by mass of acetylene black and 5% by mass of polytetrafluoroethylene) followed by kneading, and a slurry was prepared. Then, this was crimped to a copper foil and vacuum dried at 160° C. for 1 hour, and thereby a negative electrode was formed. At this time, the carbon powder (graphite) in the negative electrode crimped to the copper foil had a mass of 10 mg.
<Non-aqueous Electrolyte>

As a non-aqueous electrolyte, 0.3 mL of a solvent in which 1 mol/L of $LiPF_6$ had been dissolved [ethylene carbonate (EC) and dimethyl carbonate (DMC)=1:2 (volume ratio)] was prepared.
<First Separator>

A laboratory filter paper (GA-100 GLASS FIBER FILTER, manufactured by Advantec Group) was prepared as a first separator, and 200 mg of solid $LiPF_6$ powder was kneaded in the first separator.
<Cation-exchange Membrane>

As a cation-exchange membrane, a sulfide-glass solid electrolyte membrane $30Li_2S.26B_2S_3.44LiI$ (mol %) (prototype by Ricoh Company, Ltd.) was used. The cation-exchange membrane had a thickness of 15 μm.
<Anion-exchange Membrane>

As an anion-exchange membrane, a membrane of a plain-woven fabric made of polyethylene as a base with an ion-exchange group fixed thereto (NEOSEPTA AHA, manufactured by ASTOM Corporation) was used. The anion-exchange membrane had a thickness of 50 μm.

<Preparation of Storage Element>

Using the positive electrode, the negative electrode, the first separator, the anion-exchange membrane and the cation-exchange membrane, a non-aqueous electrolyte storage element 10 of a semi-open cell type of Example 7 as illustrated in FIG. 1 was prepared in an argon dry box.

The non-aqueous electrolyte storage element 10 of Example 7 thus prepared had a configuration that a positive electrode 1 was in contact with an anion-exchange membrane 2, that this anion-exchange membrane 2 was in contact with a first separator 3 and further that the first separator 3 was in contact with a negative electrode 5 via a cation-exchange membrane 4. Here, an outer can and an electrode lead wire of the non-aqueous electrolyte storage element 10 are not illustrated in FIG. 1.

<Method for Measuring Discharged Capacity at Beginning and after 100 Times>

The non-aqueous electrolyte storage element of Example 7 thus prepared was charged at a room temperature (25° C.) to a charge termination voltage of 5.2V at a constant current of 1 mA/cm². After the first charging, it was discharged to 3.0V at a constant current of 1 mA/cm². This cycle of charge and discharge was repeated 100 times. A discharged capacity was measured at the beginning and after charging and discharging 100 times using a charge-discharge test apparatus (HJ-SD8 SYSTEM, manufactured by Hokuto Denko Corporation). Here, the discharged capacity was a mass conversion value per 10 mg of the positive-electrode active material. In Example 7, the discharged capacity at the beginning was 120 mAh/g of positive electrode, and the discharged capacity after charging and discharging 100 times was 70 mAh/g of positive electrode. Thereafter, the discharged capacity after 300 times of charge and discharge was 40 mAh/g of positive electrode, and degradation was faster compared to Example 1.

<Presence or Absence of Lithium Salt Precipitation on Electrode Surface after Repeating Charge and Discharge 100 Times>

After repeating charge and discharge 100 times, the non-aqueous electrolyte storage element was disassembled. Surfaces of the positive electrode and the negative electrode were observed with a microscope (SMZ-1500, manufactured by Nikon Corporation), and presence or absence of $LiPF_6$ crystals was determined. In Example 7, lithium salt precipitation was not observed on the electrode surface.

Comparative Example 1

A non-aqueous electrolyte storage element of a semi-open cell type of Comparative Example 1 was prepared in the same manner as Example 1 except that a laboratory filter paper (GA-100 GLASS FIBER FILTER, manufactured by Advantec Group) including no solid $LiPF_6$ powder kneaded therein was used as the first separator of Example 1 and that no anion-exchange membrane and no cation-exchange membrane were disposed.

Next, a discharged capacity of the non-aqueous electrolyte storage element of Comparative Example 1 thus prepared was measured at the beginning and after charging and discharging 100 times in the same manner as Example 1. The discharged capacity at the beginning was 80 mAh/g of positive electrode, and the discharged capacity after charging and discharging 100 times was 75 mAh/g of positive electrode.

Comparative Example 2

A non-aqueous electrolyte storage element of a semi-open cell type of Comparative Example 2 was prepared in the same manner as Example 1 except that a laboratory filter paper (GA-100 GLASS FIBER FILTER, manufactured by Advantec Group) including no solid $LiPF_6$ powder kneaded therein was used as the separator of Example 1, that no anion-exchange membrane and no cation-exchange membrane were disposed and that a solvent in which 5 mol/L of $LiPF_6$ had been dissolved [ethylene carbonate (EC) and dimethyl carbonate (DMC)=1:2 (volume ratio)] was used as the non-aqueous electrolyte.

Next, a discharged capacity of the non-aqueous electrolyte storage element of Comparative Example 2 thus prepared was measured at the beginning and after charging and discharging 100 times in the same manner as Example 1. The discharged capacity at the beginning was 90 mAh/g of positive electrode, and the discharged capacity after charging and discharging 100 times was 50 mAh/g of positive electrode.

In Comparative Example 2, the non-aqueous electrolyte having a high concentration was used to secure an amount of the lithium salt in the non-aqueous electrolyte. However, the thick non-aqueous electrolyte had a problem in the initial film formation on a surface of the negative electrode carbon. The discharged capacity decreased as the storage element characteristics degraded due to repeated charging and discharging.

Comparative Example 3

A non-aqueous electrolyte storage element of a semi-open cell type of Comparative Example 3 was prepared in the same manner as Example 1 except that no anion-exchange membrane and no cation-exchange membrane in Example 1 were disposed.

Next, a discharged capacity of the non-aqueous electrolyte storage element of Comparative Example 3 thus prepared was measured at the beginning and after charging and discharging 100 times in the same manner as Example 1. The discharged capacity at the beginning was 100 mAh/g of positive electrode, and the discharged capacity after charging and discharging 100 times was 50 mAh/g of positive electrode.

Next, contents and results of Examples and Comparative Examples are summarized in Table 1-1 to Table 1-3.

TABLE 1-1

|  | Positive electrode | Negative electrode | Separator |
|---|---|---|---|
| Example 1 | Carbon powder + conductive agent + binder (CMC) | Carbon powder + binder (CMC) | Laboratory filter paper + $LiPF_6$ powder |
| Example 2 | Carbon powder + conductive agent + binder (CMC) | Carbon powder + binder (CMC) | Laboratory filter paper + $LiPF_6$ powder |
| Example 3 | Carbon powder + conductive agent + binder (CMC) | Carbon powder + binder (CMC) | Laboratory filter paper + $LiPF_6$ powder |
| Example 4 | Carbon powder + conductive agent + binder (CMC) | Carbon powder + binder (CMC) | Laboratory filter paper + $LiPF_6$ powder |
| Example 5 | Carbon powder + conductive agent + binder (CMC) | Carbon powder + binder (CMC) | Laboratory filter paper + $LiPF_6$ powder |

TABLE 1-1-continued

| | Positive electrode | Negative electrode | Separator |
|---|---|---|---|
| Example 6 | Carbon powder + conductive agent + binder (CMC) | Carbon powder + binder (CMC) | Laboratory filter paper + $LiPF_6$ powder |
| Example 7 | Carbon powder + conductive agent + binder (PVDF) | Carbon powder + binder (PVDF) | Laboratory filter paper + $LiPF_6$ powder |
| Comparative Example 1 | Carbon powder + conductive agent + binder (CMC) | Carbon powder + binder (CMC) | Laboratory filter paper |
| Comparative Example 2 | Carbon powder + conductive agent + binder (CMC) | Carbon powder + binder (CMC) | Laboratory filter paper |
| Comparative Example 3 | Carbon powder + conductive agent + binder (CMC) | Carbon powder + binder (CMC) | Laboratory filter paper + $LiPF_6$ powder |

TABLE 1-2

| | Non-aqueous electrolyte | Discharged capacity at the beginning (mAh/g of positive electrode) | Discharged capacity after 100 times (mAh/g of positive electrode) |
|---|---|---|---|
| Example 1 | Non-aqueous solvent including 1 mol/L of $LiPF_6$ | 120 | 80 |
| Example 2 | Non-aqueous solvent including 1 mol/L of $LiPF_6$ | 120 | 80 |
| Example 3 | Non-aqueous solvent including 1 mol/L of $LiPF_6$ | 120 | 100 |
| Example 4 | Non-aqueous solvent including 1 mol/L of $LiPF_6$ | 120 | 90 |
| Example 5 | Non-aqueous solvent including 0.5 mol/L of $LiPF_6$ | 120 | 100 |
| Example 6 | Non-aqueous solvent including 2 mol/L of $LiPF_6$ | 100 | 70 |
| Example 7 | Non-aqueous solvent including 1 mol/L of $LiPF_6$ | 120 | 70 |
| Comparative Example 1 | Non-aqueous solvent including 1 mol/L of $LiPF_6$ | 80 | 75 |
| Comparative Example 2 | Non-aqueous solvent including 5 mol/L of $LiPF_6$ | 90 | 50 |
| Comparative Example 3 | Non-aqueous solvent including 1 mol/L of $LiPF_6$ | 100 | 50 |

TABLE 1-3

| | Presence or absence of solid lithium salt at first separator at 25° C. and at discharge voltage of 4.0 V | Presence or absence of supporting salt precipitation on electrode surface after repeating charging and discharging 100 times |
|---|---|---|
| Example 1 | Present | Absent |
| Example 2 | Present | Precipitation was absent on negative electrode surface Slight precipitation present on positive electrode surface |
| Example 3 | Present | Absent |
| Example 4 | Present | Precipitation was absent on negative electrode surface Slight precipitation present on positive electrode surface |
| Example 5 | Present | Precipitation was absent on negative electrode surface Slight precipitation present on positive electrode surface |
| Example 6 | Present | Precipitation was absent on negative electrode surface Slight precipitation present on positive electrode surface |
| Example 7 | Present | Absent |
| Comparative Example 1 | Absent | Absent |
| Comparative Example 2 | Absent | Absent |
| Comparative Example 3 | Present | Present |

From the results of Table 1-1 to Table 1-3, it was found that a high discharged capacity was obtained with the non-aqueous electrolyte storage elements including the solid lithium salt of Examples 1 to 7. Here, in Examples 1 to 7, due to a large amount of excess lithium salt, the solid lithium salt precipitated on the first separator at all the discharge voltage (3.0V to 5.4V) including the discharge voltage of 4.0V.

In Comparative Example 1, an amount of the lithium salt in the non-aqueous electrolyte was small, resulted in shortage of the lithium salt due to charging. The discharged capacity decreased as the storage element characteristics degraded due to repeated charging and discharging.

In Comparative Example 2, the thick non-aqueous electrolyte was used to secure an amount of the lithium salt in the non-aqueous electrolyte, but the thick non-aqueous electrolyte had a problem in the initial film formation on a surface of the negative electrode carbon. The discharged capacity decreased as the storage element characteristics degraded due to repeated charging and discharging.

Aspects of the present invention are as follows.

<1> A non-aqueous electrolyte storage element, including:

a positive electrode which includes a positive-electrode active material capable of intercalating or deintercalating anions;

a negative electrode which includes a negative-electrode active material capable of storing or releasing metallic lithium or lithium ion, or both thereof;

a first separator between the positive electrode and the negative electrode; and a non-aqueous electrolyte which includes a non-aqueous solvent and a lithium salt dissolved in the non-aqueous solvent, wherein the non-aqueous electrolyte storage element includes a solid lithium salt at 25° C. and a discharge voltage of 4.0V, wherein the non-aqueous electrolyte storage element includes an ion-exchange membrane between the first separator and the positive electrode, between the first separator and the negative electrode, or between the first separator and the positive electrode and between the first separator and the negative electrode.

<2> The non-aqueous electrolyte storage element according to <1>, wherein the non-aqueous electrolyte storage element includes an anion-exchange membrane which selectively permeates anions, and the anion-exchange membrane is between the positive electrode and the first separator.

<3> The non-aqueous electrolyte storage element according to any one of <1> to <2>, wherein the non-aqueous electrolyte storage element includes a cation-exchange membrane which selectively permeates cations, and the cation-exchange membrane is between the negative electrode and the first separator.

<4> The non-aqueous electrolyte storage element according to <3>, wherein the non-aqueous electrolyte storage element includes a second separator between the positive electrode and the anion-exchange membrane, between the negative electrode and the cation-exchange membrane, or between the positive electrode and the anion-exchange membrane and between the negative electrode and cation-exchange membrane.

<5> The non-aqueous electrolyte storage element according to any one of <1> to <4>, wherein the first separator includes a solid lithium salt.

<6> The non-aqueous electrolyte storage element according to any one of <1> to <5>, wherein the positive-electrode active material is a carbonaceous material.

<7> The non-aqueous electrolyte storage element according to any one of <1> to <6>, wherein the negative-electrode active material is a carbonaceous material.

<8> The non-aqueous electrolyte storage element according to any one of <1> to <7>, wherein the lithium salt is $LiPF_6$.

This application claims priority to Japanese application No. 2012-103321, filed on Apr. 27, 2012 and incorporated herein by reference.

What is claimed is:

1. A non-aqueous electrolyte storage element, comprising:
a positive electrode which comprises a positive-electrode active material capable of intercalating or deintercalating anions;
a negative electrode which comprises a negative-electrode active material capable of storing or releasing metallic lithium or lithium ion, or both thereof;
a first separator between the positive electrode and the negative electrode;
a non-aqueous electrolyte which comprises a non-aqueous solvent and a lithium salt dissolved in the non-aqueous solvent; and
an ion-exchange membrane between the first separator and the positive electrode, between the first separator and the negative electrode, or between the first separator and the positive electrode and between the first separator and the negative electrode;
wherein the non-aqueous electrolyte storage element comprises an excess of lithium salt such that solid lithium salt is present in the storage element upon completion of discharge of the storage element at 25° C. and a discharge voltage of 4.0 V.

2. The non-aqueous electrolyte storage element according to claim 1, wherein:
the non-aqueous electrolyte storage element comprises an anion-exchange membrane which is selectively permeable to anions; and
the anion-exchange membrane is between the positive electrode and the first separator.

3. The non-aqueous electrolyte storage element according to claim 1, wherein:
the non-aqueous electrolyte storage element comprises a cation-exchange membrane which is selectively permeable to cations; and
the cation-exchange membrane is between the negative electrode and the first separator.

4. The non-aqueous electrolyte storage element according to claim 3, wherein the non-aqueous electrolyte storage element comprises a second separator between the positive electrode and the anion-exchange membrane, between the negative electrode and the cation-exchange membrane, or between the positive electrode and the anion-exchange membrane and between the negative electrode and the cation-exchange membrane.

5. The non-aqueous electrolyte storage element according to claim 1, wherein the first separator comprises a solid lithium salt.

6. The non-aqueous electrolyte storage element according to claim 1, wherein the positive-electrode active material is a carbonaceous material.

7. The non-aqueous electrolyte storage element according to claim 1, wherein the negative-electrode active material is a carbonaceous material.

8. The non-aqueous electrolyte storage element according to claim 1, wherein the lithium salt is $LiPF_6$.

9. The non-aqueous electrolyte storage element according to claim 1, wherein the negative electrode comprises a solid lithium salt.

10. The non-aqueous electrolyte storage element according to claim 1, wherein the negative electrode comprises the solid lithium salt in an amount of 10 parts by mass to 80 parts by mass with respect to 100 parts by mass of the negative-electrode active material.

11. The non-aqueous electrolyte storage element according to claim 1, wherein the positive electrode comprises a solid lithium salt.

12. The non-aqueous electrolyte storage element according to claim 11, wherein the positive electrode comprises the solid lithium salt in an amount of 10 parts by mass to 80 parts by mass with respect to 100 parts by mass of the positive-electrode active material.

13. The non-aqueous electrolyte storage element according to claim 5, wherein the first separator comprises the solid lithium salt in an amount of 10 parts by mass to 300 parts by mass with respect to 100 parts by mass of the first separator.

14. The non-aqueous electrolyte storage element according to claim 4, wherein the second separator comprises the lithium salt.

15. The non-aqueous electrolyte storage element according to claim 14, wherein the second separator comprises the solid lithium salt in an amount of 10 parts by mass to 300 parts by mass with respect to 100 parts by mass of the second separator.

* * * * *